US006467500B2

(12) United States Patent
Fridlyand

(10) Patent No.: US 6,467,500 B2
(45) Date of Patent: Oct. 22, 2002

(54) BALL VALVE LOCKING DEVICE

(75) Inventor: Semyon Fridlyand, Thornhill (CA)

(73) Assignee: Mueller Co., Decatur, IL (US)

( * ) Notice: Subject to any disclaimer, the term of this patent is extended or adjusted under 35 U.S.C. 154(b) by 37 days.

(21) Appl. No.: 09/814,106

(22) Filed: Mar. 22, 2001

(65) Prior Publication Data

US 2001/0032673 A1 Oct. 25, 2001

(51) Int. Cl.[7] ............................................... F16K 35/06
(52) U.S. Cl. ..................... 137/385; 137/382; 251/111; 70/178; 70/186
(58) Field of Search ................................ 137/385, 382; 251/113, 114, 111; 70/186, 178

(56) References Cited

U.S. PATENT DOCUMENTS

| 1,377,668 | A | * | 5/1921 | Cates et al. | 137/385 |
| 3,554,218 | A | * | 1/1971 | Smith | 137/385 |
| 4,062,208 | A | * | 12/1977 | Nielsen, Jr. | 70/178 |
| 4,848,724 | A | * | 7/1989 | Pettinaroli | 251/95 |

* cited by examiner

Primary Examiner—A. Michael Chambers
(74) Attorney, Agent, or Firm—W. Warren Taltavull; Manelli, Benison & Selter PLLC

(57) ABSTRACT

A locking device for a ball valve of the type having an operating stem includes a post attached to the valve body with the post extending parallel but spaced axially from the valve stem and formed to receive a locking pin between the post and valve stem to prevent rotation of the stem.

5 Claims, 2 Drawing Sheets

BALL VALVE LOCKING DEVICE

FIELD OF THE INVENTION

The present invention relates to a locking structure for a ball valve and, more specifically, to a locking device that will be able to effectively accommodate with a modest change a number of different kinds of locking pins which are available from manufacturers. Further, the present invention will provide a locking structure which is less costly to manufacture and will more reliably operate to protect the ball valve from unauthorized operation either in the open or closed positions.

BACKGROUND OF THE INVENTION

In the water and gas distribution fields, it has long been necessary to provide locking devices for valves to control the supply of water and gas to consumers, for safety reasons, during assembly of a system and for a number of other reasons. Chief among these are the prevention of unauthorized taking of the fluid being supplied and safety reasons in case of a requirement for cutoff of the fluid being supplied in the event of leakage in a distribution system. One common kind of locking system involves the use of a locking post that extends externally of the valve body generally perpendicular to the valve stem and is provided with through apertures which cooperate with an aperture provided in the valve stem handle so that an operator can prevent rotation of the valve stem by inserting a locking member through the aligned apertures of the locking post and valve stem handle. A separate locking device is then typically required to secure the locking member in place. These and other types of arrangements are relatively expensive to manufacture. In addition, such systems are subject to hand operation with relative ease and thus have not satisfied the primary reasons for their incorporation into a valve structure. Furthermore, in many instances, locking in the open position is not possible without additional devices.

SUMMARY OF THE INVENTION

The present invention avoids the difficulties of the locking devices of the prior art and provides a very reliable and less expensive locking system and one which can be easily modified to accommodate different locking pins which are available from manufacturers of such devices. Further, the locking system of this invention will be less subject to successful tampering than the prior art structures now available.

In a preferred embodiment, the valve body is provided with a locking post formed with the valve body to extend externally of the body generally parallel to the direction that the valve stem extends. The locking post and valve stem are provided or shaped with surfaces that enable the reception of a locking pin which can be inserted into a locking position by a user manually or with the aid of a tool supplied by the manufacturer of the locking pin or device. The valve mechanism in the present invention will be tamper resistant in use in view of the absence of sufficient leverage to turn the valve stem by hand.

The foregoing and other advantages will become apparent as consideration is given to the following description and accompanying drawings, in which:

DETAILED DESCRIPTION OF THE BEST MODE FOR CARRYING OUT THE INVENTION

Figure 1:
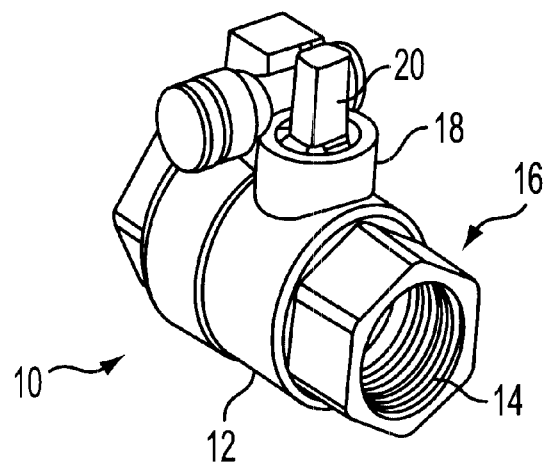
FIG. 1 is a perspective view of the valve with a locking pin in place.

Referring to the drawings, wherein like numerals refer to corresponding parts throughout the several views, there is shown in FIG. 1, a perspective view of the lockable valve generally designated at 10. The valve 10 includes a main body 12 and, at one end an opening 14 to a through passage provided in the body 12. The body 12 is formed with a collar 18 on one side thereof which surrounds a major portion of an operating valve's stem 20. The opening 14 may be surrounded with a nut shaped surface 16 to facilitate engagement of a tool on this portion of the body 12.

Figure 2:
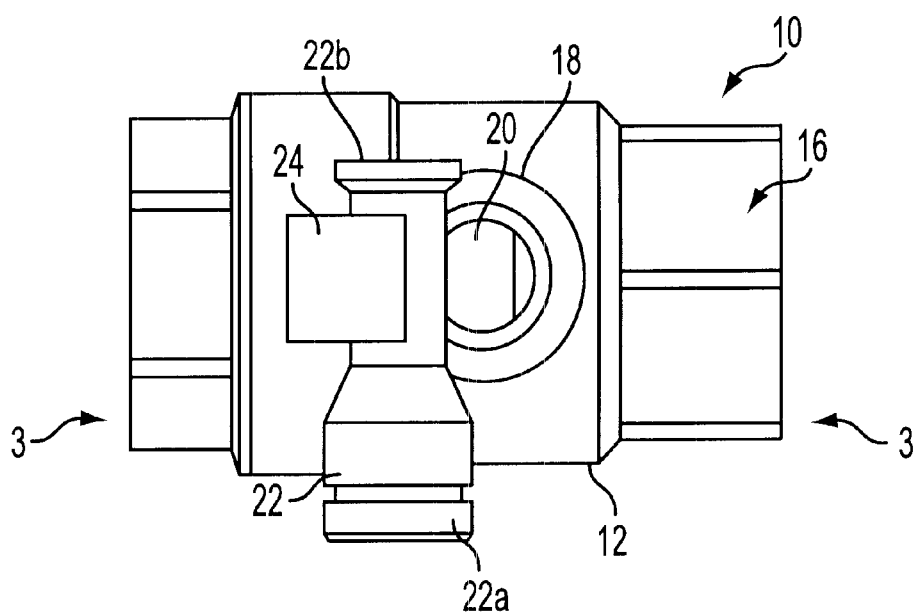
FIG. 2 is a top plan view of the valve of FIG. 1.

Referring to FIG. 2, there is shown a top plan view of the valve 10 of FIG. 1 with a locking pin 22 in place between the opposed surfaces of the stem 20 and a locking post 24. The locking post 24 is formed integrally with the body 12 and extends radially relative to the axis A and generally parallel to the direction in which the stem 20 extends. The location of the locking post may be as illustrated or rotated 90° from the position shown in accordance with the manufacturer's preference.

Figure 3:
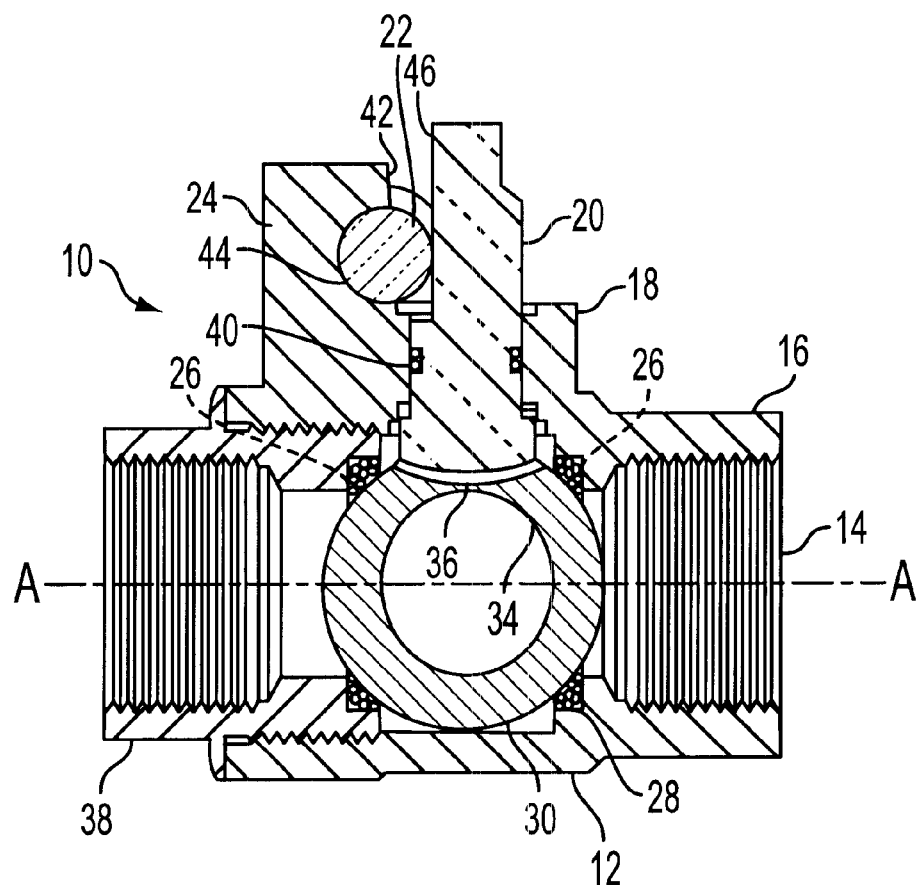
FIG. 3 is sectional view taken along lines 3-3 of FIG. 2.

Referring now to the sectional view of FIG. 3, it will be seen that the through passage includes a pair of recesses such as at 26 spaced apart along the axis A of the through passage and which support sealing rings such as at 28. The sealing rings, in turn, rotatably support a ball valve element 30 which is provided with a through passage 34. The upper portion of the ball 30 is formed with a recess 36 which receives one end of the stem 20. The end of the body 12 opposite the end 14 is provided with a threaded coupling member 38 which carries one of the recesses 26 and a sealing ring 28. The threaded interengagement between the member 38 and the threaded interior of the through passage in the valve body 12 maintains the compressive force exerted on the ball 30 of the valve member.

The above described ball valve 10 is typically operated by a separate tool having a socket for engaging the stem 20 to enable a user to rotate the stem to move the ball element and its passage between a flow blocking position and a flow permitting position relative to the through passage of the valve body 12.

As noted above, in the past, it has been the practice to provide a through bore in the locking post as well as in the exposed portion of the valve stem mechanism or a handle arm attached to the valve stem to permit a locking member to penetrate through both the locking post and the valve stem handle arm to effect the desired locking of the stem against rotation. However, the task of providing the bore in these members with the correct positioning and sizing has proved to be an expensive manufacturing operation. This operation is avoided with the structure of the present invention. Specifically, the upper portion of the locking stem 24 has a inner face 42 which is provided with a semicircular groove 44 for cooperating with a portion of the locking pin 22. In the illustrated embodiment, the confronting face of the upper portion of the stem 20 is also set back a small distance to accommodate the insertion of the pin 22 as shown in the closed position. Also, the confronting face 46 of the valve stem 20 is flat to cooperate with the cylindrical surface of the pin 22 to resist turning with the pin 22 in place as shown. It is also preferable and within the teachings of the present invention to provide the radial extent of the locking post 24 so that with the pin 22 in place, the stem 20 is not exposed or, at least, its exposure is decreased for access by a tool.

The locking pin 22 will be provided by a manufacturer who will also supply a tool for locking and unlocking the pin. A number of different types of pins are available from various manufacturers of these types of devices. As shown in FIG. 2, the typical locking pin 22 will have enlarged ends 22*a* and 22*b* to prevent removal once installed between the locking post 24 and the valve stem 20. The large end to 22*a* will typically be removable with a special tool, as noted above, to allow unlocking of the valve 10. A number of other shapes may be employed to effect the locking with the insertion of a rigid member between the locking post 24 and be valve stem 20.

Figure 4:
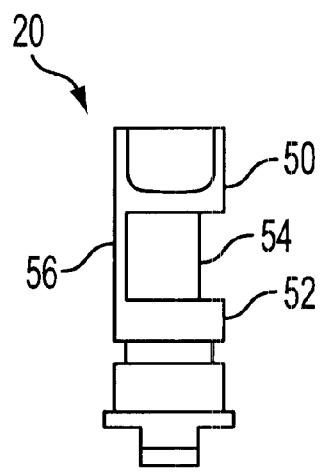
FIG. 4 is a side elevational view of a valve stem used with the structure of the present invention.

In FIG. 4, the shape of the valve stem 20 is shown more clearly prior to attachment to the ball valve element 30. The cylindrical portions of the same diameter are located at the ends 50 and 52 of the stem 20 and a reduced diameter portion 54 is located between these ends for the purpose of securely engaging the locking pin either in the open or closed positions.

Having described the invention, it will be apparent to those skilled in this art that various modifications may be made to the invention without departing from the spirit of the invention as described above.

What is claimed is:

1. A lockable valve having a valve body, a flow passage through said body, a valve member disposed in said body and movable between a flow blocking position and a flow permitting position, said valve body having an opening, a valve stem connected at one end to said valve member and extending through said opening in said valve body, said stem having a surface shaped to cooperate with a tool for rotating said stem about an axis extending through said stem and said valve member to effect movement of said valve member between said flow blocking and flow permitting positions, a locking post extending from the exterior of said valve body and having a surface facing said stem with a first portion of said surface of said locking post engaging said portion of said stem and another portion being spaced from said stem and including a shaped recess, said stem having a flat surface portion facing said another portion of said surface of said locking post so that when a locking pin having a width sufficient to span the distance between the said flat surface portion of said stem and said shaped recess, rotation of said stem will be prevented.

2. The invention as claimed in claim 1 wherein said post and valve body are integrally formed.

3. The invention as claimed in claim 1 wherein said post and valve stem extend generally parallel to one another.

4. The invention as claimed in claim 1 wherein said valve body includes a collar that at least partially surrounds said valve stem.

5. The invention as claimed in claim 1 wherein said locking post extends radially from said valve body.

* * * * *